(12) United States Patent
Wang

(10) Patent No.: US 10,636,642 B2
(45) Date of Patent: Apr. 28, 2020

(54) NANOPARTICLE MEASUREMENT FOR PROCESSING CHAMBER

(71) Applicant: Applied Materials, Inc., Santa Clara, CA (US)

(72) Inventor: Jiansheng Wang, Union City, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 16/289,065

(22) Filed: Feb. 28, 2019

(65) Prior Publication Data

US 2019/0341240 A1   Nov. 7, 2019

Related U.S. Application Data

(60) Provisional application No. 62/667,080, filed on May 4, 2018.

(51) Int. Cl.
*H01J 49/00* (2006.01)
*H01J 49/10* (2006.01)
*H01J 49/04* (2006.01)

(52) U.S. Cl.
CPC ........ *H01J 49/105* (2013.01); *H01J 49/0031* (2013.01); *H01J 49/0431* (2013.01)

(58) Field of Classification Search
CPC .. H01J 49/105; H01J 49/0031; H01J 49/0431; G01N 1/00
USPC ......................................... 250/281, 282, 288
See application file for complete search history.

(56) References Cited

U.S. PATENT DOCUMENTS

| | | | |
|---|---|---|---|
| 2004/0241867 | A1 | 12/2004 | Jones et al. |
| 2017/0330771 | A1 | 11/2017 | Wang |

FOREIGN PATENT DOCUMENTS

| | | | |
|---|---|---|---|
| JP | 2001077158 | A  * | 3/2001 |
| JP | 2001077158 | A | 3/2001 |
| KR | 20040102588 | A | 12/2004 |

(Continued)

OTHER PUBLICATIONS

Wilbur, et al ("Characterization of nanoparticles in aqueous samples by ICP-MS" Agilent Technologies, Jul. 31, 2017, pp. 1-10). (Year: 2017).*

(Continued)

*Primary Examiner* — Michael Maskell
(74) *Attorney, Agent, or Firm* — Patterson + Sheridan LLP

(57) ABSTRACT

In an embodiment, a method of measuring nanoparticles from a sample using single particle inductively coupled plasma mass spectrometry (spICPMS) includes separating the nanoparticles from a surface of the sample by: exposing the surface to a first exposure surface of a first liquid medium; and mechanically manipulating the first liquid medium; and measuring the first liquid medium using spICPMS. In an embodiment, a method of detecting nanoparticle contamination in a processing chamber includes removing a first component from the processing chamber subsequent to a processing operation; and measuring first nanoparticles from the first component using spICPMS, comprising: separating the first nanoparticles from a first surface of the first component by: exposing a first portion of the first surface to a first exposure surface of a first liquid medium; and mechanically manipulating the first liquid medium.

20 Claims, 9 Drawing Sheets

(56) References Cited

FOREIGN PATENT DOCUMENTS

KR        101581303 B1    1/2016

OTHER PUBLICATIONS

Wilbur, S., et al., "Characterization of Nanoparticles in Aqueous Samples by ICP-MS," Agilent Technologies, Jul. 31, 2017, internal pp. 1-10, <URL: https://www.agilent.com./cs/library/whitepaper/public/ICP-MS_5991-5516EN-nanoparticles.pdf>.
International Search Report and Written Opinion dated Jun. 3, 2019 for PCT/US2019/019168.
Article, Unpatterned Wafer Surface Inspection Systems, KLA-Tencor, accessed via WEB https://www.kla-tencor.com/Metrology/surfscan-series.html#2 Feb. 21, 2018, 2018 Copyright KLA-Tencor Corporation, 2 Total Pages.
Bustos, Antonio R. Montoro et al., "Single-particle-ICP-MS advances," Anal Bioanal Chem. Jul. 2016 ; 408(19): 5051-5052. doi 10.1007/s00216-016-9638-1, 3 Total Pages.
Kutscher, Julian D. et al., "Nanoparticle Characterization Via Single Particle Inductively Coupled Plasma—Mass Spectrometry (spICP-MS) Using a Dedicated Plug-in for Qtegra ISDS Software," Article, Thermo Scientific, Document No. TN43279-EN 0316S, Copyright 2016 Thermo Fisher Scientific Inc., 8 Total Pages.
Stephan, Chady et al., "Single Particle Inductively Coupled Plasma Mass Spectrometry: Understanding How and Why," Article, Perkin Elmer, Document No. 011649_01, Copyright 2014, PerkinElmer, Inc., 5 Total Pages.
Single Particle ICP-MS Brochure, Perkin Elmer, Document No. 012982_01, Copyright 2016, PerkinElmer, Inc., 88 Total Pages.
Taiwan Office Action and Search Report for Taiwan Patent Application No. 108107367 dated Dec. 6, 2019, with English translation, 7 pages.

* cited by examiner

NANOPARTICLE MEASUREMENT FOR PROCESSING CHAMBER

CROSS REFERENCE TO RELATED APPLICATIONS

This application claims benefit of U.S. provisional patent application Ser. No. 62/667,080, filed May 4, 2018, which is incorporated by reference in its entirety.

BACKGROUND

Field

Embodiments of the present disclosure generally relate to methods and equipment for measuring nanoparticles in a processing chamber.

Description of the Related Art

Nanoparticles (i.e., particles on the order of 1 to 500 nanometers (nm) in size) may occur in processing chambers and/or on wafers processed therein as a form of contamination. Detecting and/or controlling nanoparticle contamination is crucial in semiconductor manufacturing. It has been generally understood that chamber components release nanoparticles on wafers, however, many questions remain. Chamber components, such as the showerhead, faceplate, liner, gas line, etc., are made of a variety of materials (e.g., aluminum, stainless steel, ceramic, coating, etc.). Laser-liquid Particle Counting (LPC) has been used for measuring concentrations of particles from chamber components after being cleaned. But when particle sizes become small, such as less than 100 nm, and especially less than 50 nm, laser-based light scattering techniques face increasing diffractive challenges.

Current methods to measure samples having smooth and flat surfaces for nanoparticle contamination may include Scanning Electron Microscopy (SEM) coupled with Energy Dispersive X-ray (EDX) Spectroscopy or transmission electron microscope (TEM). For example, a wafer surface may be inspected using a Surfscan® SP5 unpatterned wafer inspection system, available from KLA Tencor of California, USA. However, particles of less than about 100 nm size are difficult to detect on rough and/or curved surfaces, due in part to specular reflection.

Inductively coupled plasma mass spectrometry (ICPMS) is a type of mass spectrometry which is capable of detecting metals and several non-metals at concentrations as low as one part in $10^{15}$ (part per quadrillion, ppq) on non-interfered low-background isotopes. This is achieved by ionizing the sample with inductively coupled plasma and then using a mass spectrometer to separate and quantify those ions. Commonly, a nebulizer is used to convert a sample-containing liquid into an aerosol, and that aerosol can then be swept into the plasma to create the ions. Nebulizers work best with simple liquid samples (i.e. solutions).

Tools and techniques (including calibration and quality assurance procedures) for better measuring nanoparticles from processing chamber components would be beneficial.

SUMMARY

In an embodiment, a method of measuring nanoparticles from a sample using single particle inductively coupled plasma mass spectrometry (spICPMS) includes separating the nanoparticles from a surface of the sample by: exposing the surface to a first exposure surface of a first liquid medium; and mechanically manipulating the first liquid medium; and measuring the first liquid medium using spICPMS.

In an embodiment, a method of detecting nanoparticle contamination in a processing chamber includes removing a first component from the processing chamber subsequent to a processing operation; and measuring first nanoparticles from the first component using single particle inductively coupled plasma mass spectrometry (spICPMS), comprising: separating the first nanoparticles from a first surface of the first component by: exposing a first portion of the first surface to a first exposure surface of a first liquid medium; and mechanically manipulating the first liquid medium.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Single particle inductively coupled plasma mass spectrometry (spICPMS) is an emergent ICPMS method for detecting, characterizing, and quantifying nanoparticles. spICPMS has evolved rapidly as a quantitative method for determining nanoparticle size, composition, and concentration at environmentally relevant exposure levels. For example, spICPMS has been used to characterize nanoparticles in complex matrices, such as biological, environmental and chemical. However, spICPMS samples usually must be altered to be compatible with common sample introduction systems (e.g., suspension in liquid medium). Most studies and advancements in spICPMS to date have been performed using pristine nanoparticles as test cases.

Single particle inductively coupled plasma mass spectrometry (spICPMS) equipment and methods disclosed herein may be used to measure the size, composition, and concentrations of nanoparticles on smooth, rough, planar, and non-planar surfaces. For example, spICPMS may be used to measure (e.g., detect, characterize, count, analyze) nanoparticles on smooth and flat surfaces, such as on the surface of a substrate (e.g., a wafer). Moreover, as disclosed herein, spICPMS may also be used to measure nanoparticles from rough, non-planar surfaces, such as surfaces of chamber components. Unlike Laser-liquid Particle Counting (LPC), which detects particles by scattering laser light with limited numbers of channels, spICPMS is an ions/mass-based technique that is capable of not only detecting numbers of particles, but also identifying composition of particles, including materials such as aluminum (Al), iron (Fe), copper (Cu), and yttrium (Y). Unlike prior techniques, embodiments disclosed herein may detect nanoparticle contamination on specific chamber components, and/or on specific surfaces (or portions thereof) of chamber components. The specific surfaces may be rough and/or non-planar.

By using novel nanoparticle extraction and/or separation methods, the disclosed spICPMS techniques are capable of detecting nanoparticles of sizes from about 10 nm to about 200 nm (with about 1 nm resolution), measuring nanoparticle concentrations, measuring numbers of nanoparticles, and identifying nanoparticle composition, each from smooth, rough, planar, and non-planar surfaces.

Application of spICPMS techniques to measure nanoparticles in processing chambers may assist in chamber design, production, and operation. For example, copper (Cu) contamination on wafers in non-Cu processing chambers has been an important problem. Cu nanoparticles may "re-suspend" from chamber components and/or may be deposited and diffused onto a wafer under thermal and/or plasma processing conditions. Disclosed spICPMS techniques may be used to better understand potential correlations between detected nanoparticle contamination on wafers and various chamber components.

Figure 1:
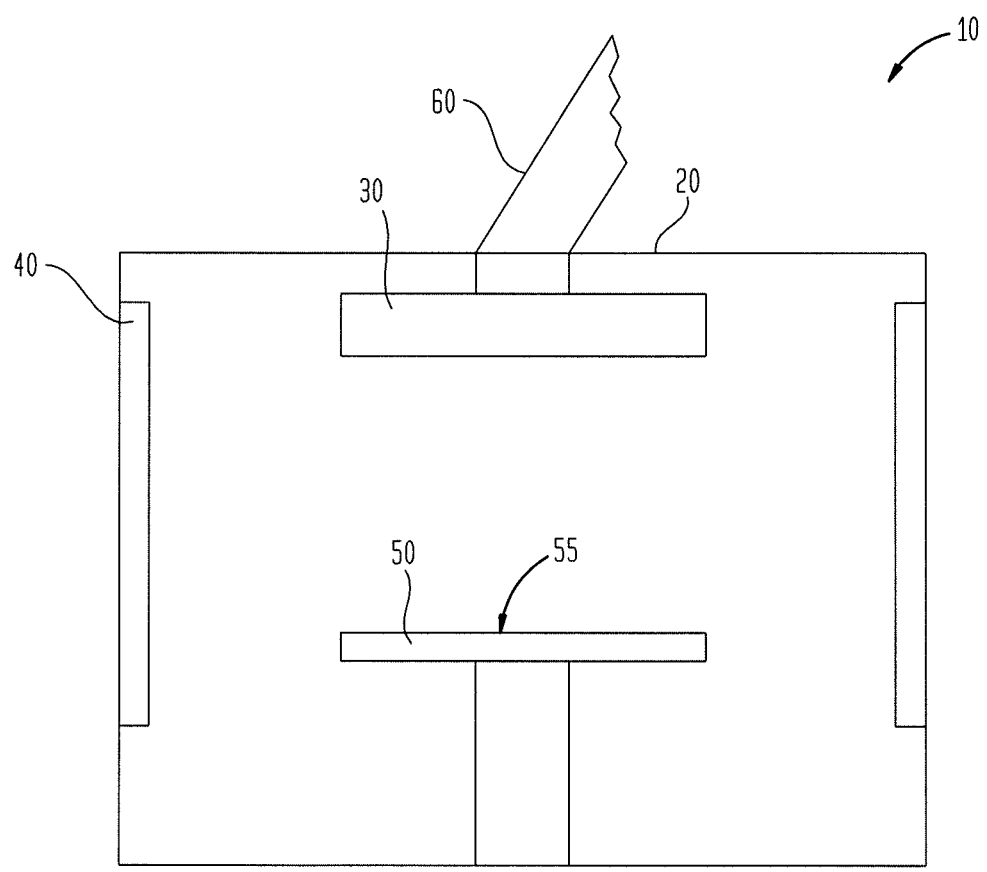
FIG. 1 illustrates a schematic, cross sectional view of an exemplary processing chamber.

FIG. 1 is a schematic, cross sectional view of an exemplary processing chamber 10. The processing chamber 10 may be utilized alone or as a processing module of an integrated semiconductor substrate processing system, or cluster tool. The processing chamber 10 has a body 20. The body 20 of the processing chamber 10 has one or more sidewalls (e.g. cylindrical), a lid, and a bottom surface. The sidewalls, lid, and bottom surface define an interior volume. Various components are disposed within the body 20 of the processing chamber 10. For example, a gas distributor 30 (e.g., showerhead) may be disposed proximate the lid and within the interior volume. A gas line 60 can be coupled to the gas distributor 30 to introduce one or more gases via the gas distributor 30 into the interior volume of the processing chamber 10. A substrate support 50 is also disposed in the interior volume, with a substrate supporting surface 55 that faces the gas distributor 30. The one or more chamber sidewalls enclose a liner 40 surrounding the substrate support 50. Any of these components may be a source of nanoparticle contamination during processing.

Figure 2A:
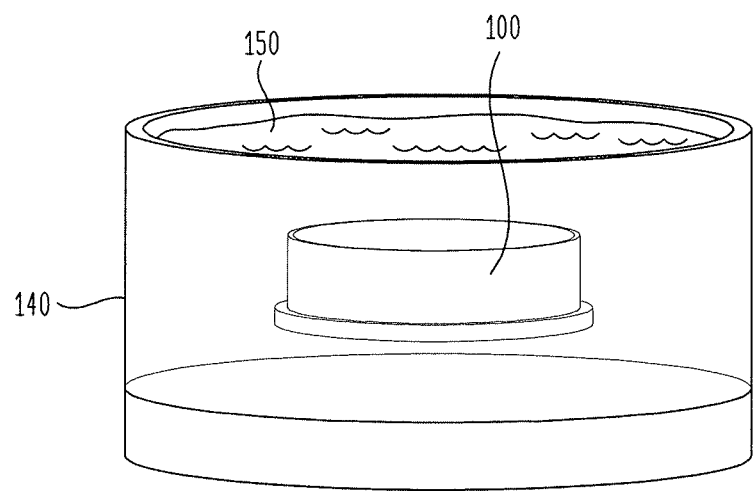
FIGS. 2A and 2B illustrate arrangements for separating nanoparticles from a sample taken from the processing chamber of FIG. 1.
Figure 2B:
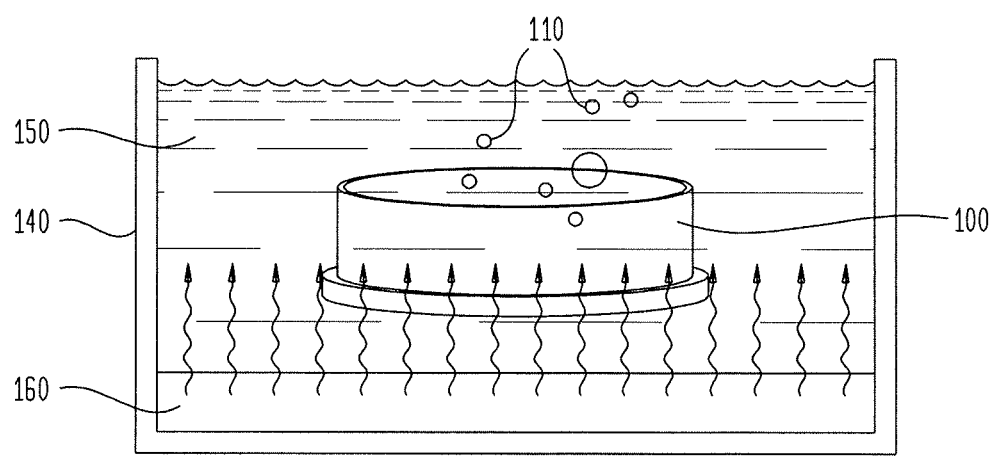

Measurement of nanoparticles on a sample may begin with extraction and/or separation of the nanoparticles from the sample. For example, as illustrated in FIG. 2A, a sample 100, such as a chamber component, may be submerged in a liquid medium 150 using a submersion container 140. The liquid medium 150 should be sufficiently pure or of known composition to allow for meaningful spICPMS measurement. In some embodiments, the liquid medium 150 is deionized water or ultrapure water (e.g., Milli-Q water produced by a Milli-Q® Integral Water Purification System, available from Merck KGaA of Darmstadt, Germany). In other embodiments, the liquid medium 150 can include organic solvents, surfactants, cosolutions, reactants, or other agents to affect the surface chemistry of the sample 100 and/or better separate the nanoparticles from the sample 100. In some embodiments, the submersion container 140, the liquid medium 150, and/or the sample 100 may be exposed to mechanical manipulation, such as agitation or sonication, to better separate the nanoparticles from the sample 100. For example, as illustrated in FIG. 2B, submersion container 140 may be placed on a sonicator 160 (e.g., an ultrasonicator or a megasonicator) to mechanically manipulate (e.g., vibrate) the liquid medium 150 against the sample 100 to better separate the nanoparticles 110 (shown here with exaggerated size for explanation purposes) from the sample 100. Other mechanical manipulation techniques, such as jet circulation, in which jets formed in the liquid impinge the surface of the sample 100 to loosen and dislodge nanoparticles, can also be used. The resulting liquid medium 150 with separated nanoparticles 110 may be measured using spICPMS to determine the size, composition, and/or concentration of nanoparticles on sample 100. It should be appreciated that sample 100 may have smooth, rough, planar, and non-planar surfaces.

Figure 3A:
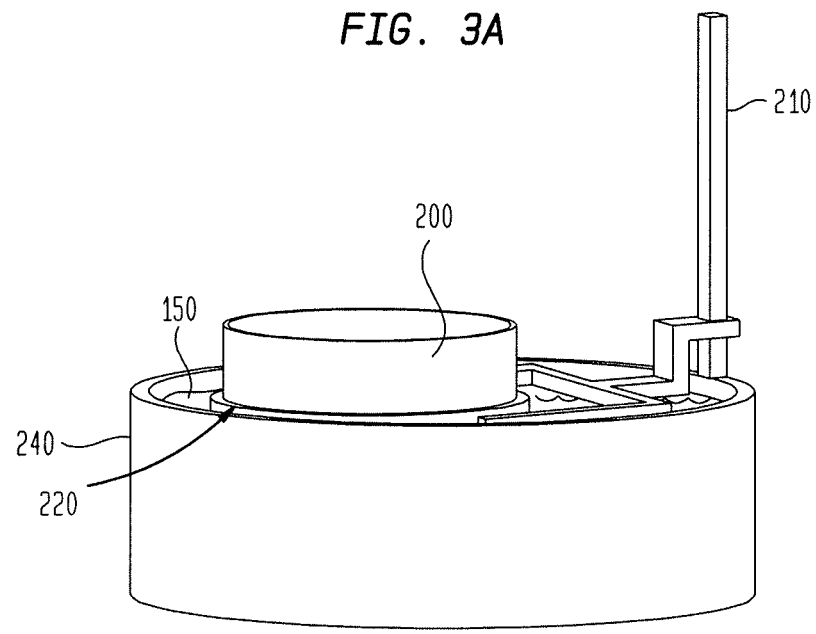
FIGS. 3A and 3B illustrate alternative arrangements for separating nanoparticles from a sample taken from the processing chamber of FIG. 1.

Similar techniques may be utilized to separate nanoparticles from a specific surface of a sample. As illustrated in FIG. 3A, a surface 220 of a sample 200 can be exposed to the liquid medium 150 in an exposure container 240. The sample 200 can be held by a support 210 such that the surface 220 contacts the liquid medium 150. Other surfaces of sample 200 may be held out of liquid medium 150 during exposure of surface 220. In some embodiments, the exposure container 240, the liquid medium 150, and/or the sample 200 may be exposed to mechanical manipulation while surface 220 is exposed to the liquid medium 150 to better separate the nanoparticles from the sample 200. The resulting liquid medium 150 with nanoparticles may be measured using spICPMS to determine the size, composition, and/or concentration of nanoparticles on surface 220 of sample 200. It should be appreciated that surface 220 of sample 200 may be smooth or rough.

Figure 3B:
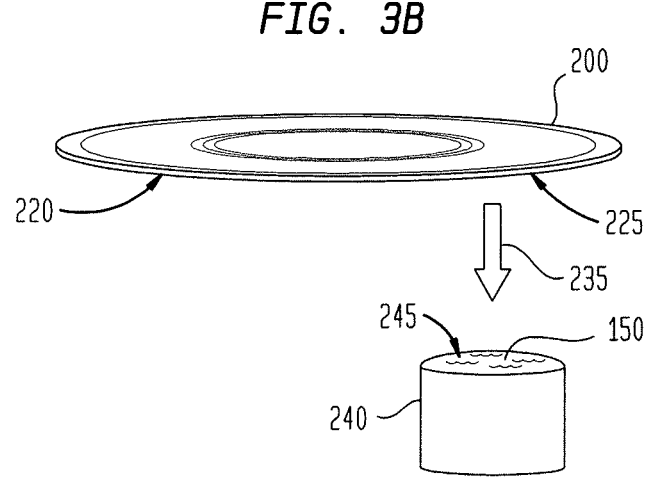

Similar techniques may be utilized to separate nanoparticles from a particular portion of a specific surface of a sample. As illustrated in FIG. 3B, exposure container 240 may have dimensions such that an exposure surface 245 of liquid medium 150 is smaller than surface 220 of sample 200. In this case, an exposure portion 225 of the surface 220 is contacted by the exposure surface 245 of liquid medium 150. (It should be appreciated that the exposure portion 225 has the same or smaller area as exposure surface 245.) For example, sample 200 may be lowered, as illustrated by arrow 235, so that exposure portion 225 of surface 220 comes into contact with exposure surface 245 of liquid medium 150. Other portions of surface 220 and other surfaces of sample 200 may be held away from liquid medium 150 during exposure of the exposure portion 225 of surface 220. In some embodiments, the exposure container 240, the liquid medium 150, and/or the sample 200 may be exposed to mechanical manipulation while the exposure portion 225 of surface 220 is exposed to the exposure surface 245 of liquid medium 150 to better separate the nanoparticles from the sample 200. The resulting liquid medium 150 with nanoparticles may be measured using spICPMS to determine the size, composition, and/or concentration of nanoparticles on exposure portion 225 of surface 220 of sample 200. It should be appreciated that surface 220 of sample 200 may be smooth or rough, and planar or non-planar.

Figure 4A:
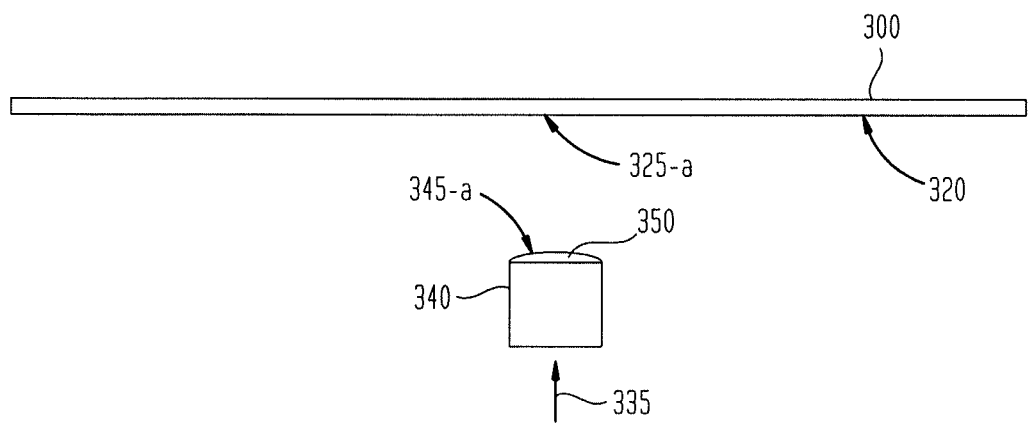
FIGS. 4A and 4B illustrate additional alternative arrangements for separating nanoparticles from a sample taken from the processing chamber of FIG. 1.

Similar techniques may be utilized to separate nanoparticles from multiple exposure portions of a specific surface of a sample. As illustrated in FIG. 4A, exposure container 340 may have dimensions such that a first exposure surface 345-$a$ of liquid medium 350 is smaller than surface 320 of sample 300. A first exposure portion 325-$a$ of the surface 320 may be exposed to the first exposure surface 345-$a$ of liquid medium 350. For example, exposure container 340 may be moved in the direction of arrow 335 (i.e. toward the sample 300) so that first exposure portion 325-$a$ of surface 320 comes into contact with first exposure surface 345-$a$ of liquid medium 350. Here, the first exposure surface 345-$a$ is shown as a meniscus protruding from the exposure container 340. The meniscus is brought into contact with the surface 320, and a clearance is maintained between the container 340 and the surface 320. Surface tension in the liquid medium 350 can be used to maintain contact between the first exposure surface 345-$a$ and the first exposure portion 325-$a$. Other portions of surface 320 and other surfaces of sample 300 may be held away from liquid medium 350 during exposure of the first exposure portion 325-$a$ of surface 320.

Figure 4B:
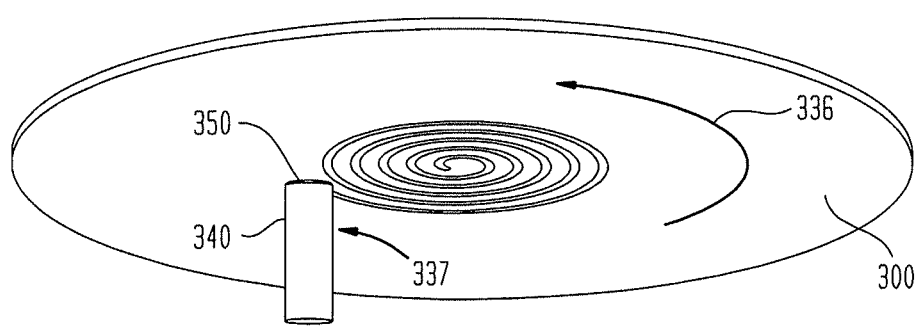

In some embodiments, the exposure container 340, the liquid medium 350, and/or the sample 300 may be exposed to mechanical manipulation while the first exposure portion 325-$a$ of surface 320 is exposed to the first exposure surface 345-$a$ of liquid medium 350 to better separate the nanoparticles from the sample 300. As illustrated in FIG. 4B, nanoparticles may be successively separated from other portions of surface 320. For example, sample 300 may be positioned to contact other exposure portions of the surface 320 to the first exposure surface 345-$a$ by moving the sample 300 transversely (i.e., parallel to first exposure surface 345-$a$) relative to exposure container 340. FIG. 4B illustrates sample 300 rotating 336 about an axis that is perpendicular to the exposure surface while exposure container 340 moves laterally 337, thereby creating a spiral pattern of contact between the exposure portion of surface 320 and the exposure surface of liquid medium 350. Other embodiments may include linear transverse motion of sample 300, possibly coupled with the lateral motion of exposure container 340, to scan some or all of the surface 320. The resulting liquid medium 350, with nanoparticles potentially recovered from many areas, or the entire surface, of the sample, may be processed using spICPMS to determine the size, composition, and/or concentration of nanoparticles on the multiple portions of surface 320 of sample 300. It should be appreciated that surface 320 of sample 300 may be smooth or rough, and planar or non-planar. Exposure to the liquid medium 350 may recover nanoparticles from a variety of surface morphologies through liquid contact with the surface.

Figure 5:
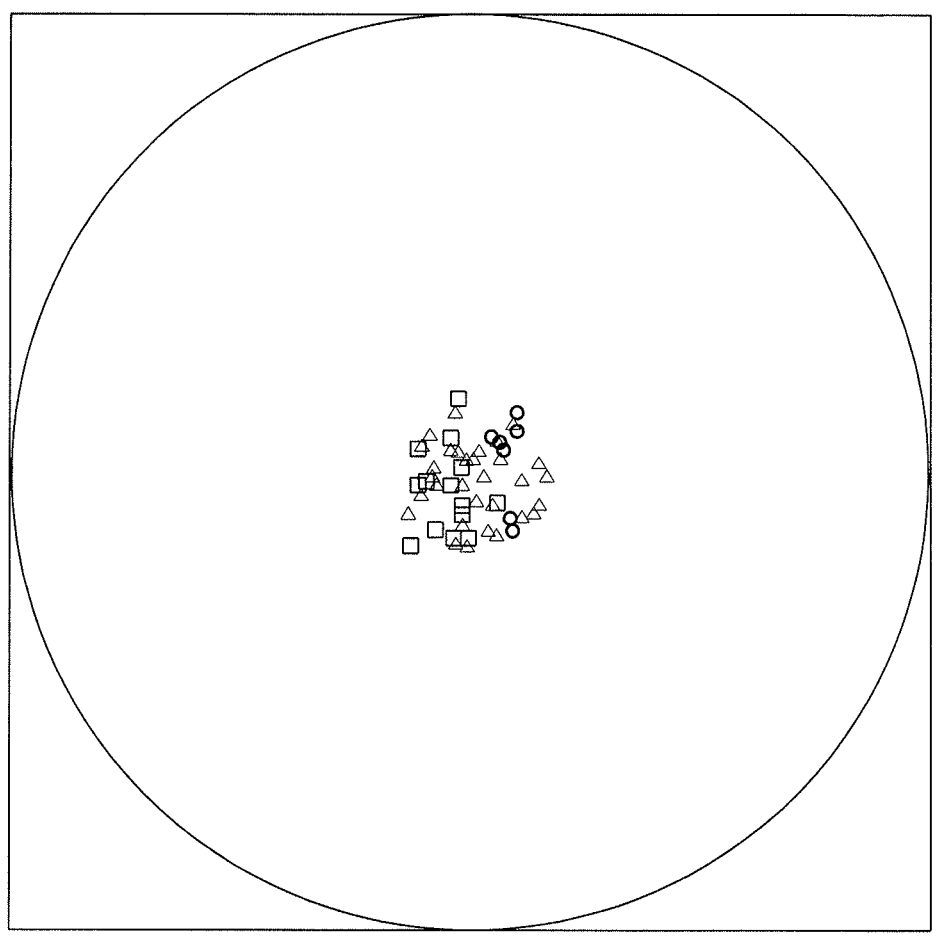
FIG. 5 illustrates results of measurement of multiple portions of a surface.

Similar techniques may be utilized to separate and measure nanoparticles from multiple exposure portions of a specific surface of a sample. For example, by identifying a corresponding liquid medium 350-$i$ with each exposure portion 325-$i$ of surface 320, a separate spICPMS measurement may be conducted for each exposure portion 325-$i$. In one embodiment, exposure container 340 and/or liquid medium 350-$i$ within exposure container 340 is measured and/or replaced between each exposure. In another embodiment, multiple exposure containers 340 may be utilized to expose each of the exposure portions 325-$i$ to respective liquid mediums 350-$i$ simultaneously. The results of to such spICPMS measurement of multiple portions of a surface is illustrated in FIG. 5.

Other embodiments may include a variety of motions between surface 320 and exposure container(s) 340. For example, a first subset of the exposure containers may be raised to expose a first subset of portions of surface 320 at a first point in time, a second subset (possibly overlapping with the first subset) of exposure containers 340 may move translationally relative to surface 320, and a third subset (possibly overlapping with the first subset and/or the second subset) of exposure containers 340 may be raised to expose a third subset of portions of surface 320 at a second point in time. For example, individual raising actuators (e.g., elevators) may be associated with each exposure container 340. Thus, the first subset of exposure containers may be raised at the first point in time, while the remaining exposure containers are not raised. In some embodiments, motions between surface 320 and exposure container(s) 340 may include mechanical manipulations that produce fluid oscillations. Such motions may include motion normal to the substrate surface, transverse to the substrate surface, or anything in between. Such manipulations can provide improved separation for nanoparticles vulnerable to a particular vector of fluid force.

The above spICPMS techniques for measurement of nanoparticles on a sample may be utilized to better detect nanoparticle contamination within a processing chamber. For example, a chamber component may be removed from the processing chamber (following a processing operation), and the component or a surface thereof may then be measured using the above spICPMS techniques. In some embodiments, a used (i.e., during a processing operation) component may be measured, and a similar, new (i.e., unused during a processing operation) component may be measured as a control sample. For example, the new component may have the same size and shape as the used component, or the new component may have the same size, shape, and composition as the used component. If the prevalence of nanoparticles is different for the used component, the difference may be deemed to be indicative of nanoparticle contamination to/from the component that occurred during use while the chamber component was installed in the processing chamber.

In other embodiments, the above spICPMS techniques for measurement of nanoparticles on a sample may be utilized with multiple chamber components. For example, three components may be removed from a first processing chamber (following a processing operation) and measured using the above spICPMS techniques (possibly also measuring similar, new control samples). A similar, second processing chamber may be adapted to operate with one of the three components removed, shielded, or replaced with an inert (e.g., ceramic) component. The processing operation is run in the second chamber, and the three components from the second chamber are removed and measured. Differences in nanoparticle prevalence between the first chamber and the second chamber may be deemed attributable to the one component that had been removed, shielded, or replaced.

For example, a first processing chamber may have a first process kit including three chamber components, and a second processing chamber may have a second process kit identical to the first process kit. One of the three components may be removed from the second processing chamber. An identical process may be run in the first and second processing chambers. The first process kit may be removed and processed according to spICPMS. The second process kit may also be removed and processed according to spICPMS. Differences in nanoparticles on the components of the first process kit and components of the second process kit may be attributable to removal of the component from the second processing chamber. Additional tests may be performed varying which component(s) are removed, shielded, or replaced during each test. Comparison of the results may assist detecting nanoparticle contamination within a processing chamber. For example, a particular component may be identified as a substantial source of nanoparticle contamination using methods described herein, and the processing chamber may then be redesigned to mitigate the contamination (for example, by removing, shielding, or replacing the identified source of contamination).

The above spICPMS techniques for measurement of nanoparticles on a sample may be implemented as calibration and/or quality assurance procedures for processing chamber operations (e.g., chamber cleaning operations). For example, a control sample may include a known type of nanoparticle and/or a known concentration of nanoparticles. Measurement of nanoparticles may include comparing the spICPMS results for the test sample to that for the control sample. In some embodiments, the type of liquid medium and/or mechanical manipulation may be adjusted in subsequent tests based on the comparison. In some embodiments, the comparison and/or adjustment may be adapted for selected ratios of different elements of the nanoparticles. (The different elements have different densities, and will therefore elute differently for a given size particle.)

Experimental Results

Determination of transport efficiency and other parameters for spICPMS was performed with diluted National Institute of Standards and Technology gold nanoparticles RM 8013 (i.e., 60 nm diameter). The spICPMS instrument was operated in single-element mode, such as m/z 89 for Y, m/z 63 for Cu, etc. NIST trace metal calibration was performed for nanoparticle measurement per instrument manufacturer instructions. Other NIST standard nanoparticles may be used, including RM 8011 (gold-nominal 10 nm diameter) and RM 8012 (gold-nominal 20 nm diameter). It is currently believed that better results may be achieved by selecting a standard that is as similar in dimension as possible to the expected nanoparticle contamination. Calibration may be executed in multi-element mode, in which the spICPMS instrument resolves multiple elements in the sample. Standard nanoparticles might include, for example, both gold and iron.

Data in the following figures demonstrate spICPMS's capability of nanoparticle measurement from smooth and from rough, and/or from planar and from non-planar surfaces. Such measurement may be utilized to better detecting potential correlations between nanoparticles on wafers and on processing chamber components.

(1) Measurement of Iron (Fe) Nanoparticles from a Gas Line (Smooth, Non-Planar Surface)

Figure 6:
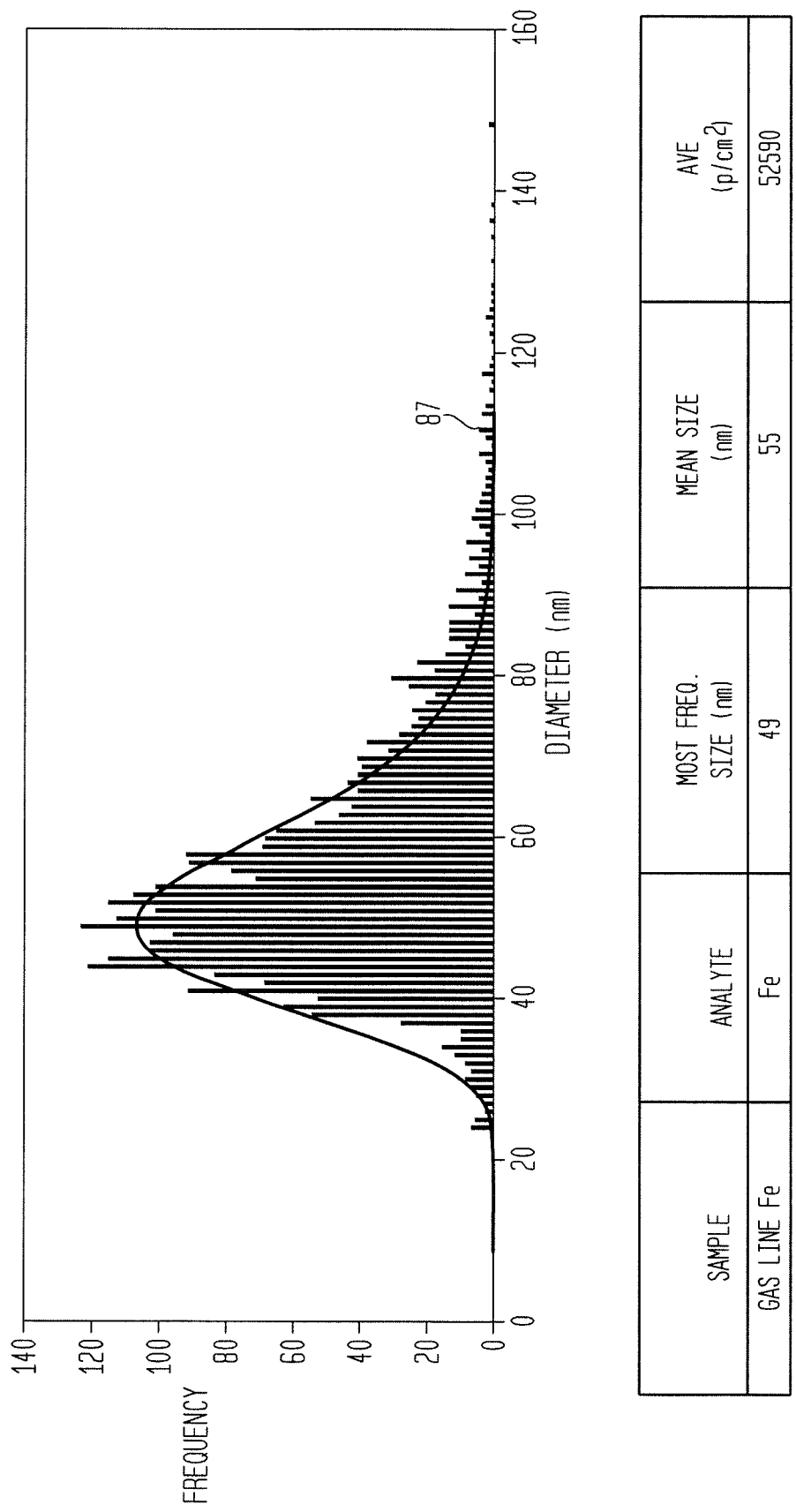
FIG. 6 illustrates measurement results for a sample gas line.

FIG. 6 shows measurement results for a sample gas line. Nanoparticles were separated from the gas line by exposing the interior of the gas line to a liquid medium to collect nanoparticles from the interior of the gas line in the liquid medium. In this case, the gas line was filled with ultrapure water, which was collected and measured with spICPMS. The results show concentrations of Fe nanoparticles from 20 nm to 150 nm. It is currently believed that gas lines may be a source of nanoparticle contamination in processing chambers.

(2) Nanoparticle Measurement from Chamber Components (Rough, Non-Planar Surface)

Figure 7:
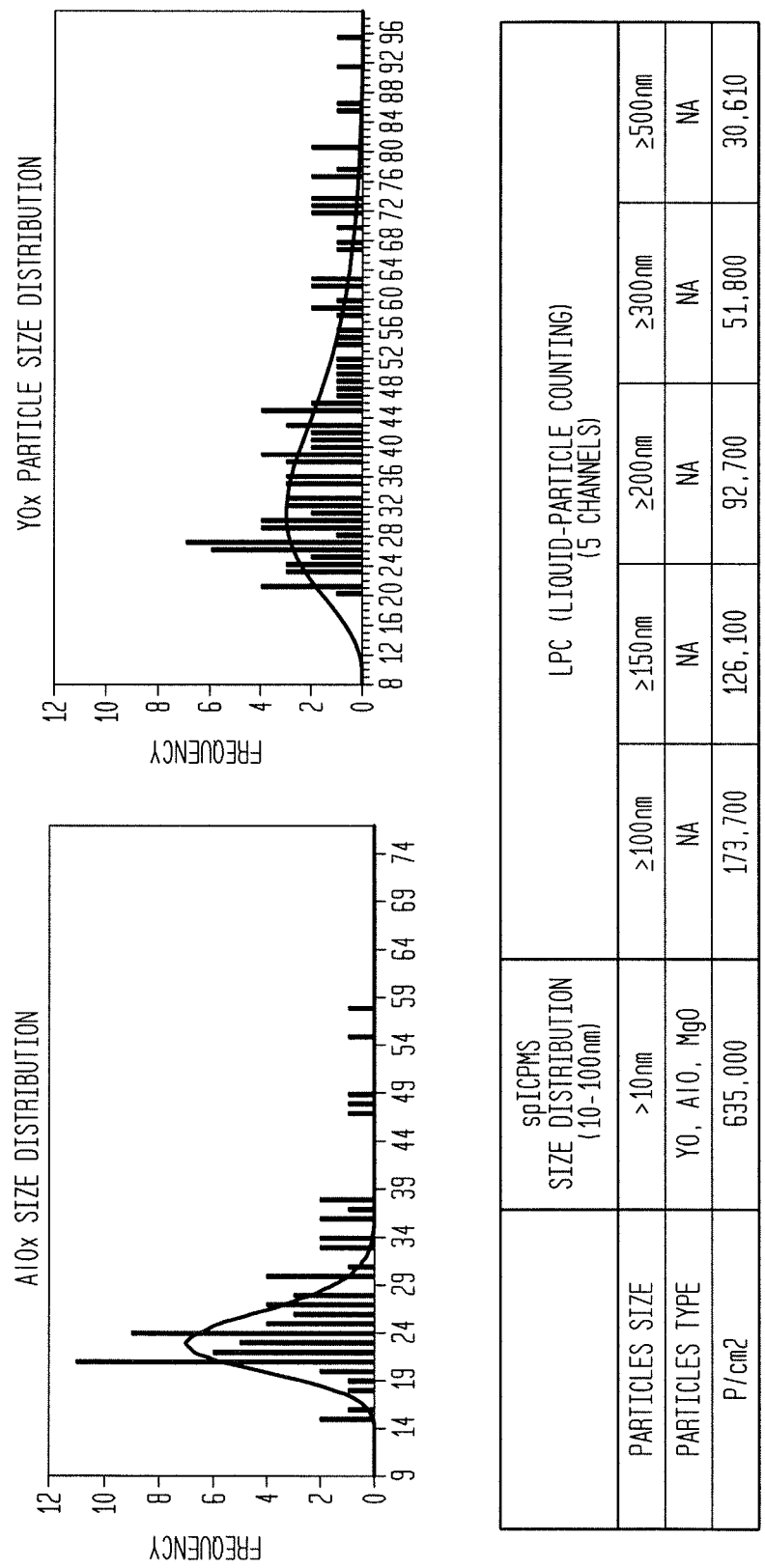
FIG. 7 illustrates measurement results for a sample yttria-coated cathode sleeve.

FIG. 7 shows measurement results for a sample yttria-coated cathode sleeve. Nanoparticles were separated from the cathode sleeve by the above separation techniques, including submersion in deionized water. The results show concentrations of nanoparticles from 10 nm to 500 nm. LPC results, being unable to distinguish Particle Types, identifies five channels in sizes from 100 nm to 500 nm. The spICPMS results (in both graphical and tabular format) show Al nanoparticles from the anodized Al sleeve, and Y nanoparticles from the Yttria coating. The spICPMS results show measurements of nanoparticles with size distribution from >10 nm to ~100 nm in 1 nm resolution. These particles are believed to be in metal oxide forms. The spICPMS results show the majority of nanoparticles are Y, Al, and Mg in metal oxide forms.

(3) Cu Nanoparticles from Al 6061 (Rough, Flat Surface)

Figure 8:
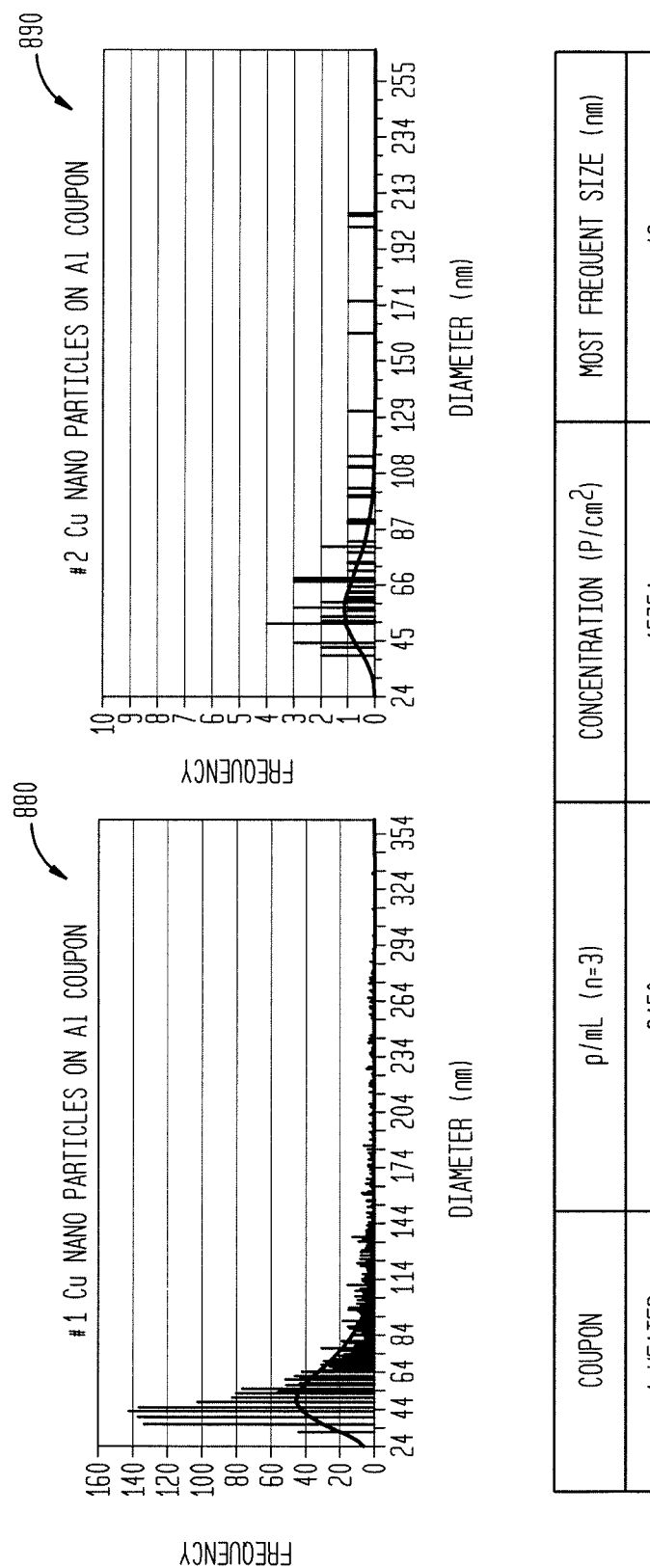
FIG. 8 illustrates measurement results for Cu nanoparticles on Al coupons after a thermal processing operation.

FIG. 8 shows measurement results for Cu nanoparticles on Al coupons after a thermal processing operation. Nanoparticles were separated from the Al coupons by the above separation techniques, including submersion in deionized water and ultra-sonication. As illustrated at 880, significant numbers of Cu nanoparticles were detected from the Al 6061 coupon after being heated to 300-350° C. multiple times. As illustrated at 890, the control coupon showed an order of magnitude lower intensity. This finding of Cu nanoparticles supports a hypothesis that Cu in bulk Al may have migrated to Al surface under high temperature. spICPMS measurement technique enabled nanoparticle measurement on such rough, non-planar surfaces.

(4) Al Contamination on Wafer (Smooth, Flat Surface)

Figure 9:
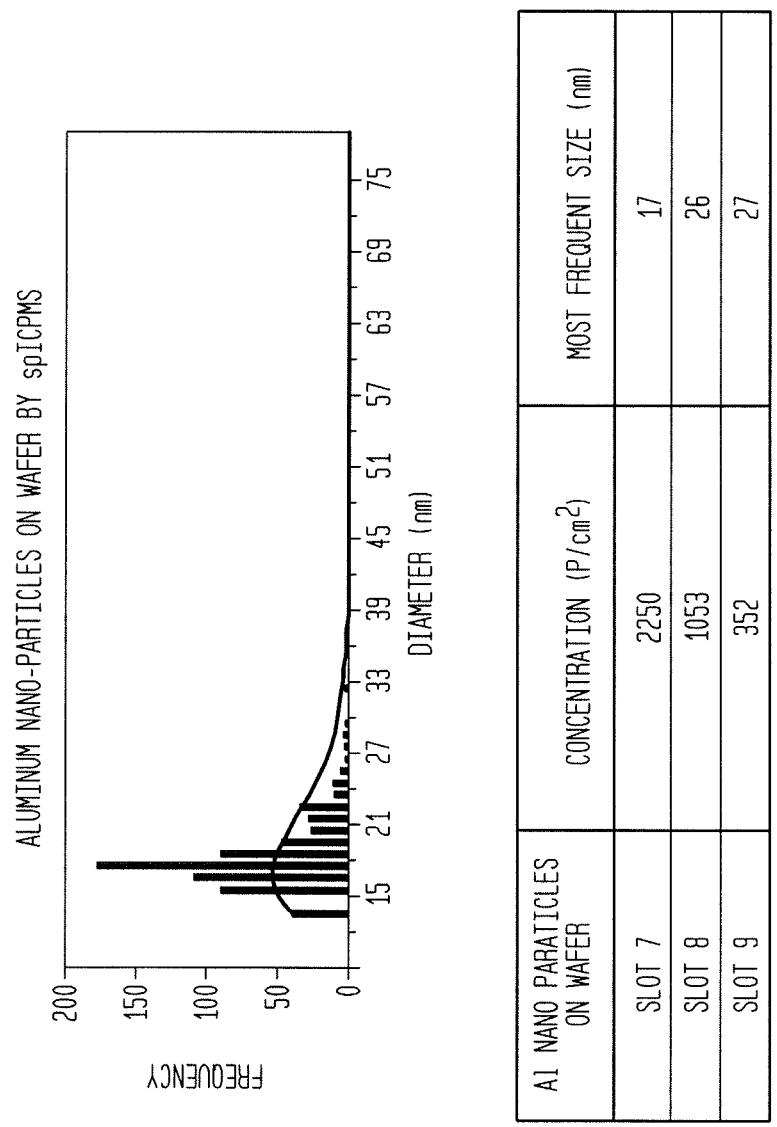
FIG. 9 illustrates measurement results for Al nanoparticles on wafers.

FIG. 9 shows analytical results for Al nanoparticles on wafers. Nanoparticles were separated from the wafers by the above separation techniques.

While the foregoing is directed to implementations of the present disclosure, other and further implementations of the disclosure may be devised without departing from the basic scope thereof, and the scope thereof is determined by the claims that follow.

What is claimed is:

1. A method of measuring nanoparticles from a sample using single particle inductively coupled plasma mass spectrometry (spICPMS), comprising:
    separating nanoparticles from a first surface of the sample by:
        exposing the first surface to a first liquid medium, wherein at least a first portion of the first surface of the sample is not exposed to the first liquid medium while exposing the first surface of the sample; and
        mechanically manipulating the first liquid medium; and
    measuring the first liquid medium using spICPMS.

2. The method of claim 1, wherein measuring the first liquid medium using spICPMS further comprises determining at least one of a size, a composition, and a concentration of the nanoparticles from the sample.

3. The method of claim 1, wherein separating the nanoparticles from the first surface of the sample comprises separating the nanoparticles from a processing chamber component.

4. The method of claim 1, wherein the first surface of the sample is at least one of rough and non-planar.

5. The method of claim 1, wherein exposing the first surface to the first liquid medium comprises exposing the first surface to a first exposure surface of the first liquid medium.

6. The method of claim 1, wherein at least a second surface of the sample is not exposed to the first liquid medium while exposing the first surface of the sample.

7. The method of claim 1, wherein mechanically manipulating the first liquid medium comprises placing an exposure container on a sonicator, wherein the exposure container contains the first liquid medium.

8. The method of claim 1, wherein the first liquid medium comprises at least one of deionized water, ultrapure water, organic solvents, surfactants, cosolutions, and reactants.

9. The method of claim 1, wherein the nanoparticles comprise copper.

10. A method of detecting nanoparticle contamination in a processing chamber, comprising:
    removing a first component from the processing chamber subsequent to a processing operation;
    measuring first nanoparticles from the first component using single particle inductively coupled plasma mass spectrometry (spICPMS), comprising:
        separating the first nanoparticles from a first surface of the first component by:
            exposing a first portion of the first surface to a first exposure surface of a first liquid medium; and
            mechanically manipulating the first liquid medium;
    removing a second component from an unused processing chamber, wherein the second component has a same size and a same shape as the first component;
    measuring second nanoparticles from the second component using spICPMS; and
    comparing results from the measuring the first nanoparticles to results from the measuring the second nanoparticles.

11. The method of claim 10, further comprising:
    removing a third component from the processing chamber subsequent to the processing operation;
    measuring third nanoparticles from the third component using spICPMS; and
    comparing the results from the measuring the first nanoparticles to results from the measuring the third nanoparticles.

12. The method of claim 11, further comprising shielding the third component during the processing operation.

13. The method of claim 10, wherein measuring the first nanoparticles from the first component determines at least one of a size, a composition, and a concentration of the first nanoparticles from the first component.

14. A method of measuring nanoparticles from a sample using single particle inductively coupled plasma mass spectrometry (spICPMS), comprising:
    separating nanoparticles from a surface of the sample by:
        exposing the surface to a first liquid medium, comprising:
            exposing a first portion of the surface of the sample to a first exposure surface of the first liquid medium; and
            after exposing the first portion, moving the sample transversely relative to the first exposure surface, and exposing a second portion of the surface of the sample to the first exposure surface of the first liquid medium; and
        mechanically manipulating the first liquid medium; and
    measuring the first liquid medium using spICPMS.

15. The method of claim 14, wherein exposing the surface to the first liquid medium comprises exposing the entire surface to the first liquid medium.

16. The method of claim 14, wherein mechanically manipulating the first liquid medium comprises placing an exposure container on a sonicator, wherein the exposure container contains the first liquid medium.

17. The method of claim 14, wherein the separating further comprises exposing the second portion of the surface of the sample to a second exposure surface of the first liquid medium.

18. The method of claim 17, wherein the separating further comprises:
    exposing the second portion of the surface of the sample to a third exposure surface of a second liquid medium; and
    mechanically manipulating the second liquid medium.

19. The method of claim 18, wherein the mechanically manipulating the second liquid medium comprises exposing the second portion of the first surface to jet circulation.

20. The method of claim 18, wherein the mechanically manipulating the second liquid medium comprises moving the second liquid medium normal to the surface of the sample.

* * * * *